March 7, 1950 A. McL. NICOLSON 2,499,605
METHOD AND APPARATUS FOR DETECTING WAVES
Filed Feb. 25, 1943 4 Sheets-Sheet 1
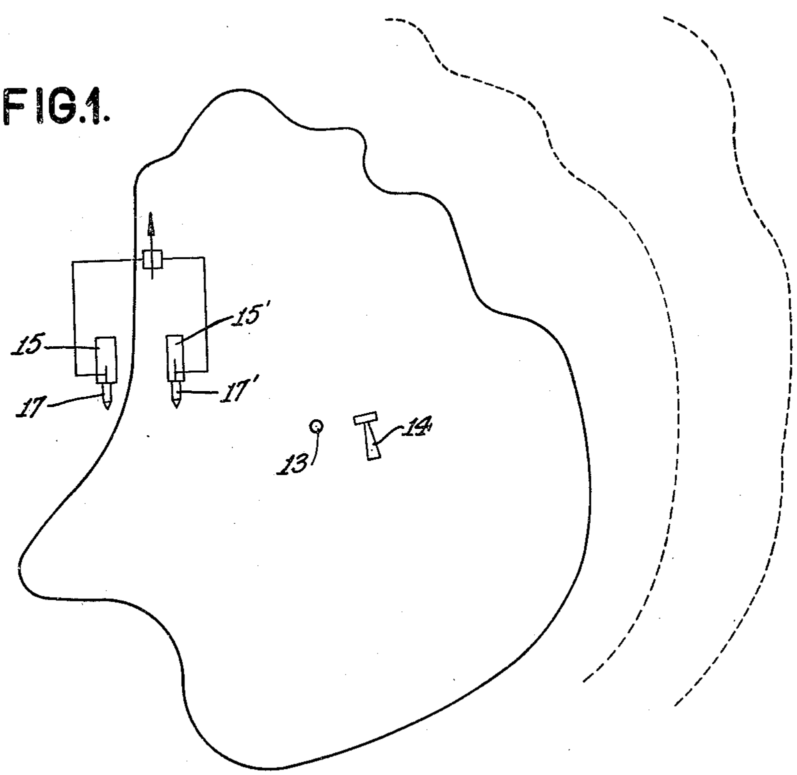
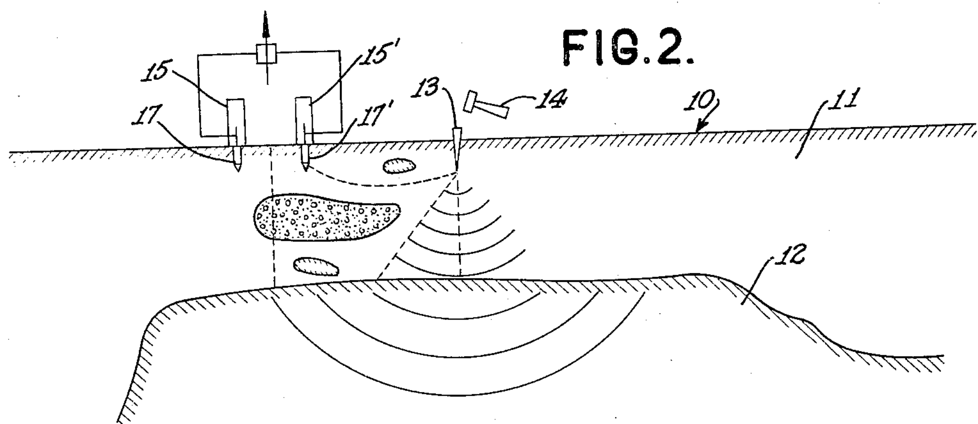
INVENTOR.
ALEXANDER MC LEAN NICOLSON
BY
Hoguet, Neary & Campbell
ATTORNEYS.

March 7, 1950 A. McL. NICOLSON 2,499,605

METHOD AND APPARATUS FOR DETECTING WAVES

Filed Feb. 25, 1943 4 Sheets-Sheet 2

INVENTOR.
ALEXANDER McLEAN NICOLSON
BY
Hoguet, Neary & Campbell
ATTORNEYS

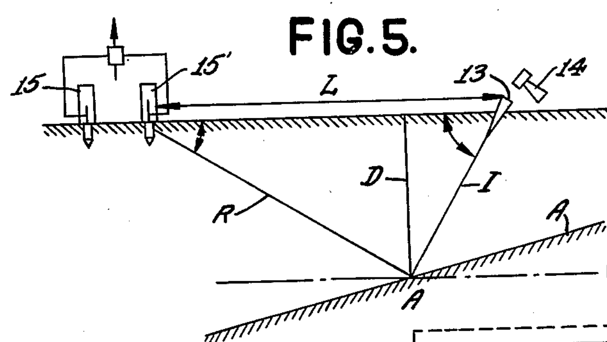
FIG. 6.
61 61' 62 62a 63 64 60 59 58 68 65 69 59' 60' 58' 68' 65' 66 67 57 57' 56 55 55' 54 54' 52 51 51' 53 50 48 47 49 48' 50' 47' 49' 46 45 45' 16 16'
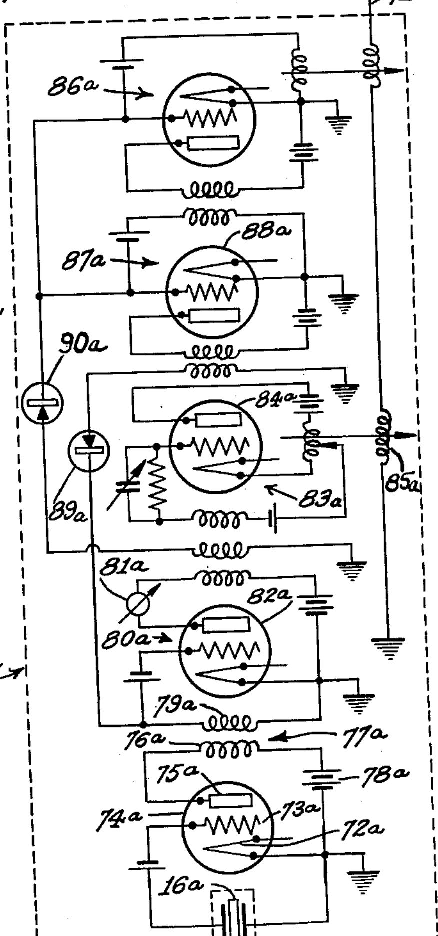
INVENTOR.
ALEXANDER MC LEAN NICOLSON
BY
Hoguet, Neary & Campbell
ATTORNEYS.

METHOD AND APPARATUS FOR DETECTING WAVES
Filed Feb. 25, 1943
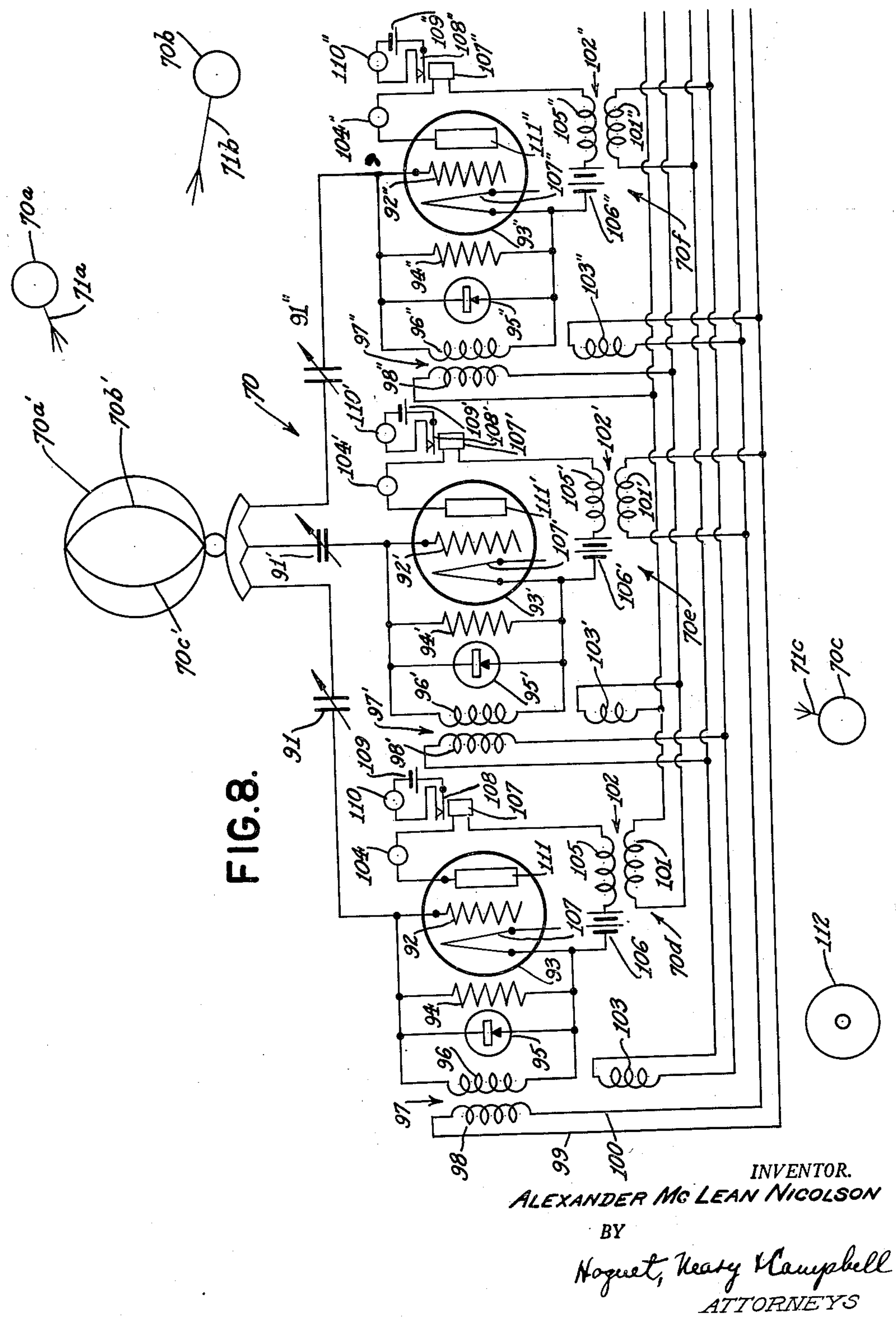
INVENTOR.
ALEXANDER MC LEAN NICOLSON
BY
Hoguet, Neary & Campbell
ATTORNEYS Patented Mar. 7, 1950

2,499,605

UNITED STATES PATENT OFFICE 2,499,605

METHOD AND APPARATUS FOR DETECTING WAVES

Alexander McLean Nicolson, New York, N. Y.

Application February 25, 1943, Serial No. 477,034

8 Claims. (Cl. 181—0.5)

1

This invention relates to methods and devices for determining the direction and distance of wave sources and relates particularly to methods and devices for determining the geophysical structure of terrain, for subterranean or submarine investigation and mapping, for sound ranging and distance measuring, an art which I term "Wavemetry."

This application is a continuation-in-part of my co-pending application for "Wave sensitive and wave front detecting devices," filed December 16, 1938, Serial No. 246,130, now abandoned.

An object of the invention is to provide devices for determining the direction and distance of a wave source or of an object capable of reflecting waves.

Another object is to provide devices having a plurality of detecting elements which selectively cooperate to establish the position of a wave source by allowing only the detector first energized by an advancing wave front to give a characteristic signal whereby the direction of the source is established.

Another object is to provide methods and devices capable of detecting and signalling the advent of an advancing wave front whereby the presence of strata having differing vibration transmitting characteristics can be mapped by interchange of the operation of the detectors.

A further object of the invention is to provide devices whereby the distance of a wave source of vibration, such as, for example, an explosion, a continuous wave or cessation of same can be measured as well as the direction of such a source, whereby effective sound ranging can be accomplished.

Other objects will become apparent from the description of typical embodiments of the invention hereinafter described.

The invention in its broadest aspects comprises a device having one or more vibration sensitive detectors which are associated in such a way that when one of the detectors is energized by an advancing wave front, it will signal the advent of the wave front and render the remaining detector or detectors inoperative to signal the advent of the wave front. The detectors are used in pairs or in groups of more than two which are capable of producing signals which indicate the direction and/or distance of the wave source.

2

The detectors are of various types capable of response to the advent of wave fronts having wave lengths varying from short wave radio waves to waves having audible frequencies. For example, piezoelectric crystals, photoelectric cells and radio receivers may be used, depending upon the frequency or slope of the wave that is to be measured.

Devices embodying the invention may be used for selecting any specifically generated wave front, as of the soonest echo, of source of energy; or of any required later signal selection.

With devices of this type the nature and position, the contour and the depth of materials of interest and substances of value at any depth below the surface can be explored. Likewise, devices embodying the invention may be applied to gun ranging, and any type of explosive discharge, such as, for example, the firing of a projectile, torpedo or mine, may be located by means of a group of detectors that instantly indicate their sequence of detection, thus determining the direction from which the wave front advances and the position of the discharge.

For a better understanding of the invention reference may be had to the accompanying drawings, in which:

Figure 1 and Figure 2 are a plan and section view of a terrain with one form of the invention illustrated diagrammatically, applied to the mapping of the terrain;

Figure 5 is a diagrammatic showing of the use of devices of the type disclosed in Figure 3 for determining the slope of subterranean reflecting bodies;

Figure 6 is a schematic diagram of another form of thermionic selector apparatus embodying the invention; and Figures 7 and 8 show detecting devices having radio transmitting and receiving connections.

Figure 3:
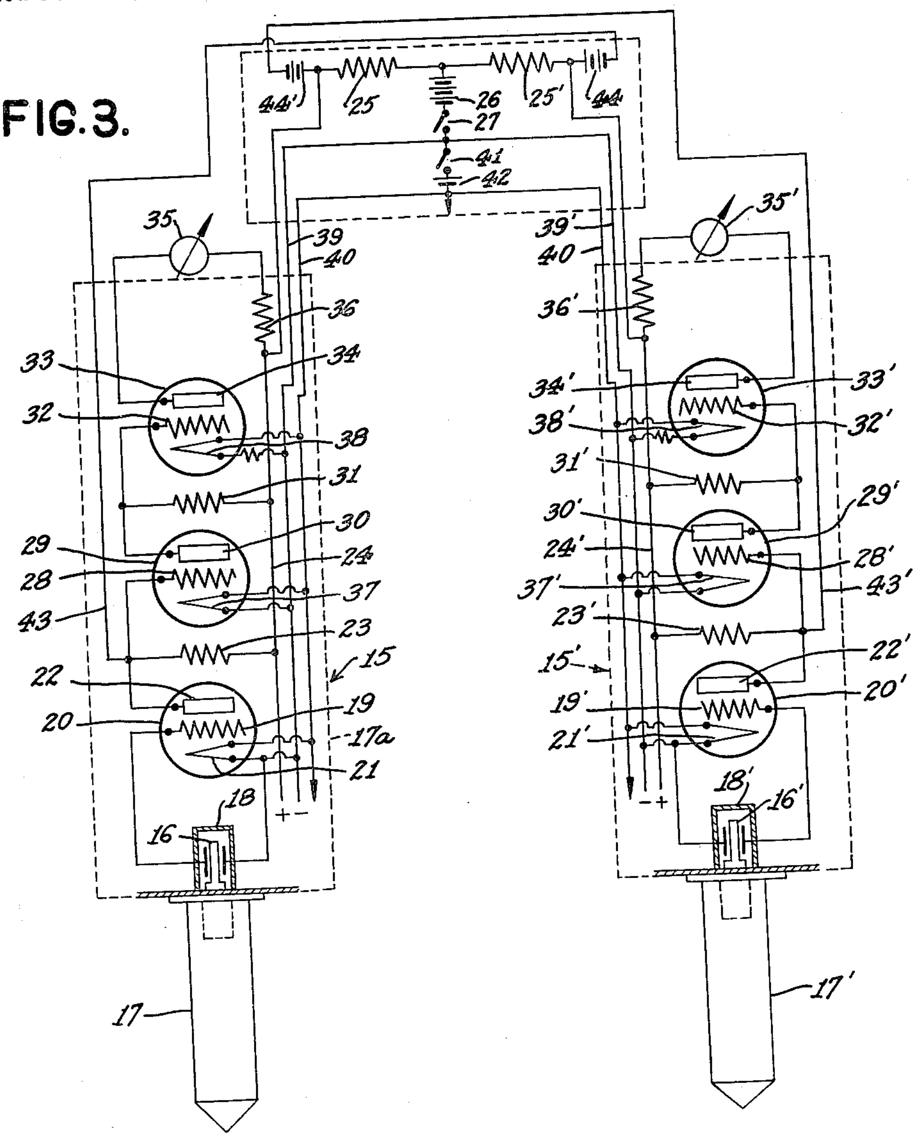
Figure 3 is a schematic drawing of one form of thermionic selector apparatus embodying the invention.

Figures 1 and 2 illustrate the application of one form of device embodying the invention to subterranean investigation. An example of terrain 10 is indicated, representing an overburden 11 upon foundation rock 12. On a reasonable scale, the propagated wave front may be obtained by striking an anvil 13, set into the earth's surface, with a sledge hammer or pile driver 14. On a larger scale, explosive charges may be applied to generate the wave front at a predetermined source. According to the elastic constants of the paths presented, the wave front is propagated at various velocities over and under the terrain. Sensitive detectors of the type disclosed in Figure 3 are positioned relative to the origin 13 of the outgoing energy and are capable of indicating generally subterranean contours and variations in subterranean structure.

A detecting device of the type shown in Figure 3 includes detectors 15, 15', which are mounted on suitable spikes 17 and 17', adapted to be driven into the surface of the terrain 10. Since the detectors 15 and 15' are substantially identical in construction, it will be necessary to describe only one in detail, corresponding parts on the other detector being designated by primed reference characters.

In the form illustrated, the detector 15 includes a piezoelectric crystal 16 which is mounted in a casing 17*a* so as to receive any expected vibration due to the signal. For protection, the crystal 16 should preferably be fitted in a sealed receptacle 18. If desired, the crystal 16 and the thermionic elements in the detector 15 may be enclosed within an exhausted envelope or otherwise very closely associated together. One terminal of the crystal 16 is connected to the control grid 19 of a conventional type thermionic tube 20, the filament 21 of which is connected to the other terminal of the crystal 16. The plate element 22 of the tube 20 is connected in series with a plate-load resistor 23, a conductor 24 and a resistance 25 to the positive terminal of a source of electrical energy 26, the negative terminal of which is connected through a conventional type switch 27 to ground.

The plate electrode 22 of the tube 20 is also connected to the control grid 28 of a second thermionic tube 29, the plate 30 of which is connected through a resistance 31 to the conductor 24. The plate electrode 30 of the tube 29 is also connected to the control grid 32 of a third tube 33. The plate electrode 34 of the tube 33 is connected in series with an indicating instrument 35 and a protective resistor 36 to the conductor 24. The filaments 21, 37 and 38 of the tubes 20, 29 and 33, respectively, are all connected in parallel and to the conductors 39 and 40 which are connected to a conventional type switch 41 and to a source of filament voltage 42.

In order to provide for the suppression of the unit 15 if the unit 15' is energized first, the plate electrode 22 of the tubes 20 is connected by a conductor 43 to the negative terminal of a biasing battery 44, the positive terminal of which is connected to the conductor 24'. In similar fashion, suppression of the unit 15', if the unit 15 is energized first, is provided by an electrical connection 43' from the plate electrode 22' of the vacuum tube 20' to the negative terminal of the biasing battery 44', the positive terminal of which is connected to the conductor 24.

When the switches 27 and 41 are closed, one or the other of the detectors 15 or 15' will assume control. If, for example, the detector 15 assumes control, the plate current drawn by the tubes 20, 29 and 33 will produce a relatively large voltage drop across the resistor 25, reducing the voltage applied to the plate 22' of the tube 20' and to the grid 28' of the tube 29', to such a low value that the detector 15' will not respond to wave energy. Under these conditions, the detector 15 is sensitive to wave energy while the detector 15' is insensitive to wave energy. Thereafter, when an advancing wave front strikes the stake 17, an alternating voltage is impressed on the grid 19 of the tube 20 by the crystal 16, resulting in switching the control from the detector 15 to the detector 15'.

As illustrated in Figure 2, it will be assumed that the properties of the stratum 12 are such that the wave velocity therein is greater than in the overburden 11 and that the overburden 11 contains materials or areas that propagate waves at varying velocity as is almost universally the case. The stratum 12 is capable of transmitting an advancing wave front at greater velocity than the overburden 11, inasmuch as it is a more elastic material, such as, for example, rock. In a truly isotropic medium of great extent, an advancing wave front will reach the detector 15' prior to the detector 15 under all conditions. However, in the type of overburden 11 illustrated, the various wave fronts set up by the source of vibration, by reflection or refraction from the stratum 12 and at sources along the stratum travel at different velocities and, as a result, are dissipated or are propagated in such a way that one wave front will reach the detectors prior to others.

For example, the time required for the wave front to pass down through the overburden 11 along the stratum 12 and to the detector 15 may be less than the time required for a wave front to pass from the anvil 13 through the overburden 11 to the detector 15' because of the intervention of bodies or areas that propagate waves at lower velocities than the remainder of the overburden or stratum. As a result, an advancing wave front will reach the detector 15 at the edges of these zones first. By repeatedly taking readings with the detectors, it is thus possible to map the salient characteristics of the subterranean strata or to determine the presence or absence of objects such as large detached masses beneath the surface of the earth and peaks and hollows in subterranean strata.

Proceeding in this manner, points are located on the earth's surface where the surface and subterranean waves reach the detecting apparatus at approximately the same time, which points are plotted to give a give contour map as shown in Figure 1. From a contour map of this type much useful information can be deduced about the strata beneath the earth's surface.

Figure 4:
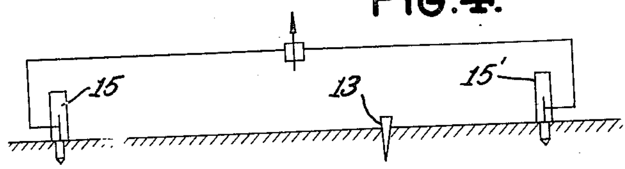
Figure 4 is a diagram representing another method of testing terrains.

Figure 4 illustrates a method of computing areas which isochronously transmit an advancing wave front and thereby indicate the relative abundance of substances of higher velocity of propagation. The detectors 15 and 15' are placed on opposite sides of a source of vibration 13. By shifting one or the other of the detectors 15 and 15' a short distance toward or from the source 13 an interchange in the operation of the detectors can be caused to take place, thereby indicating that at a point between the first and second positions of the shifted detector, a signal will be received isochronously with the detector which has not been shifted. The distances from the points to the wave source are indications of the subterranean structure.

For instance, if one site extends to a distance 100% further (or twice as far) from the generated source of sound than another isochronous site, then it may be inferred that the further site represents a directional sense having the ratio four to one excess of minerals, in correspondence with square root of the elasticity-density ratio $$\sqrt{\frac{e}{d}}$$

where $e$ is the elasticity modulus and $d$ is density. Hence, any suspected mineral present may indicate itself by the relative isochrony of unequal surface areas and corresponding abundance. In an isotropic medium, equal areas will be isochronous in the propagation of waves, while variations in the medium will result in isochronism for unequal areas, the greater area indicating the presence of a medium for which the value $$\sqrt{\frac{e}{d}}$$

is higher or one capable of transmitting vibrations at a higher velocity.

By way of example, if the detector 15′ is initially sensitive, and the generated wave front reaches it first, control will be switched to the detector 15. When the same generated wave front reaches the detector 15, control will again be switched back to the detector 15′. The detector 15′ is then moved farther away from the source 13 or the detector 15 is moved closer to the source 13 and the above procedure is repeated until the generated energy switches control from the detector 15′ to the detector 15 where it remains. The occurrence of this condition indicates that the generated wave passed the insensitive detector 15 before it reached the sensitive detector 15′. The point of isochrony can then be readily determined, since it will be approximately midway between the last two positions of the detector that is being moved. By repeating this procedure at different points about the source 13, a contour curve analogous to the one shown in Figure 1 can be drawn, giving useful information about the subterranean formations.

Devices of the type described above may likewise be used for determining the slant of subterranean strata as illustrated in Figure 5 of the drawings. In this type of determination, the wave source, such as the spike or anvil 13, is inserted in the earth at an acute and known angle and the detectors 15 and 15′ placed in spaced relationship to the wave source. A vibration is set up as by intermittently striking the anvil and the detectors 15 and 15′ are shifted from place to place on the terrain. The wave fronts set up by the wave source are largely directional in their characteristics inasmuch as laterally directed components are of lesser velocity. The directional components will be reflected by the stratum A in the usual way and accordingly will energize the detectors sooner.

By shifting the detectors and by noting which detector is energized first, it will thus be possible to determine which detector is in the line of reflected wave and thus obtain the length L of the base of the triangle defined by the lines of incidence I and reflection R of the wave front. Then if the positions of the wave source and detectors are reversed, the second angle of the triangle can be determined by varying the inclination of the wave directing source until one of the detectors is actuated. Knowing the length of the base of the triangle L and the adjacent angles, the lengths of the remaining sides can be calculated and the slant of the reflecting surface easily determined since a line normal N to said surface bisects the angle between the lines of incidence and reflection. Likewise, the depth D of the reflecting point can readily be determined trigonometrically.

If desired, conventional type geophone recorders may be employed in place of the detectors 15 and 15′ for detecting the reflected wave in the method illustrated in Figure 5.

Figure 6 illustrates another type of detecting apparatus for detecting the advent of wave fronts according to the invention. This apparatus differs from that shown in Figure 3 in that both detectors are initially responsive to wave energy. Referring to Figure 6, the crystals 16 and 16′ are connected in parallel with the grid leaks 45 and 45′, which are connected together and to ground at the point 46, and to the control grids 47 and 47′ of the vacuum tubes 48 and 48′. Grid bias for the tubes 48 and 48′ is provided by conventional cathode resistors 49 and 49′ connected in the cathode circuits of the tubes 48 and 48′.

The plate electrodes 50 and 50′ of the tubes 48 and 48′ are connected in series with the plate resistors 51 and 51′, the common point 52 of which is connected to the positive terminal of a source of direct current 53, the negative terminal of which is connected to ground. The plate resistors 51 and 51′ are connected through blocking condensers 54 and 54′ to the grid resistors 55 and 55′, the common point of which is connected to ground at 56.

The grid resistors 55 and 55′ are connected in series with grid biasing batteries 57 and 57′ to the control grids 58 and 58′ of conventional type gas tubes 59 and 59′, which may be types 2050 or 2051, for example. The plate electrodes 60 and 60′ are connected in series with any suitable indicators 61 and 61′, the common point 62 of which is connected through a switch 62$a$ to the positive terminal of a source of direct current 63, the negative terminal of which is grounded at 64. The cathodes 65 and 65′ of the tubes 59 and 59′ are connected together and to the center tap 66 of the secondary winding of a filament transformer 67 which energizes the filaments 68 and 68′. The center tap 66 is also connected in series with a resistance 69 to the ground 64.

Initially, neither of the gas tubes 59 and 59′ conducts current. If, however, the crystal 16 is energized by wave energy first, the voltage produced thereby will be amplified by the tube 48 and impressed upon the control grid 58 of the gas tube 59. This will cause the tube 59 to become conducting, so that current will flow from the source 63 through the resistance 69. The voltage drop across the resistance 69 reduces appreciably the voltage applied to the plate 60′ of the tube 59′. Moreover, since the resistance 69 is in the cathode circuits of both tubes 59 and 59′, the voltage drop produced by the current flowing through it produces a relatively large negative bias on the control grid 58′ of the tube 59′. As a result, the tube 59′ is rendered inoperative and will not respond to signals from the crystal 16′.

In order to restore the detecting apparatus to its initial condition, the switch 62$a$ is opened, causing the tube 59 to cease conducting, whereupon the detecting apparatus will again respond to wave energy.

It will be noted that if wave energy reaches the crystal 16 before the crystal 16′, the indicator 61 will operate, but the indicator 61′ will be rendered in operative. On the other hand, if the crystal 16' receives wave energy before the crystal 16, the indicator 61' will be energized and the indicator 61 will be rendered inoperative. It will be readily apparent that the detecting apparatus illustrated in this figure may be effectively employed in the methods described above in connection with Figures 1, 2, 4 and 5.

Instead of employing the particular wave front detectors described hereinabove in the methods illustrated in Figures 1, 2, 4 and 5, conventional type geophones with recorders may be employed for the purpose of determining the order and time in which the wave fronts are received.

When the overburden is very thick or when special geophysical terrains involving the presence of shale oil are indicated, the rapid charting of depth contours over large terrains makes necessary a wireless interconnecting selector system for the detectors. Any station, for example, the station 70, as shown in Figure 8, may be the central station at which readings are taken, but it is to be understood that the detecting elements may be distributed in any manner whatsoever. In any event, that station which receives the earliest signal from a wave source will function to indicate the advent of the signal. The other and tardier station or stations function only to indicate a negative or absent signal.

Figure 8 shows a plurality of intercommunicating detector sets 70*a*, 70*b* and 70*c*, provided with radio antennae 71*a*, 71*b* and 71*c*, arranged preferably for local directional beam transmission between each other and the central station 70. In this embodiment, the detector set which receives the wave front or vibration signal first indicates the arrival of the wave front on a dial or annunciator at the location, and, at the same time, causes a signal such as by short wave, for example, to be transmitted to the central station 70. This signal is also received by the selector sets at which the wave front arrives later and renders them ineffective to signal the arrival of the wave front.

The signals transmitted by the various selector sets 70*a*, 70*b* and 70*c* are preferably different, so that they may be separately detected by the central station 70. For example, signals of frequencies $f'$, $f''$ and $f'''$, respectively, may be transmitted by the selector sets 70*a*, 70*b* and 70*c*.

Since the selector sets 70*a*, 70*b* and 70*c* are substantially identical in construction, it will be necessary to describe only one which is shown in detail in Figure 7. Referring to Figure 7, the selector set 70*a* comprises the detecting crystal 16*a*, opposite sides of which are connected to the filament 72*a* and through a source of biasing potential to the control grid 73*a* of the electronic tube 74*a*. The plate electrode 75*a* of the tube 74*a* is connected to the primary winding 76*a* of a transformer 77*a* and to the positive terminal of a source of operating potential 78*a*, the negative terminal of which is connected to ground. The secondary winding 79*a* of the transformer 77*a* is connected to a second amplifying circuit 80*a* having an annunciator 81*a* in the plate circuit of an electronic tube 82*a*.

The amplifying circuit 80*a* is inductively coupled to a radio frequency transmitting circuit 83*a*, including a transmitting tube 84*a*, which is designed to be normally inoperative, but just at the threshold of operation. Electrical energy of frequency $f'$ is inductively coupled to a circuit 85*a* which feeds the antenna 71*a*.

The device also includes a radio frequency detecting circuit 86*a* which receives from the antenna 71*a* any radio frequency energy that may be transmitted from either of the other stations 70*b* or 70*c*. The received energy is amplified by a conventional amplifying circuit 87*a* including an amplifier tube 88*a*. The radio frequency detecting circuit 86*a* and the amplifying circuit 87*a* should both be tuned broadly enough to permit the reception of signals of frequencies $f''$ and $f'''$. In the detectors 70*b* and 70*c* the corresponding circuits should be tuned to receive signals of frequencies $f'$ and $f'''$ and $f'$ and $f''$, respectively.

The plate circuit of the amplifying tube 88*a* is inductively coupled to a blocking circuit including conventional rectifying means 89*a* which supplies a rectified blocking potential to the grid of the tube 82*a*, thereby preventing the actuation of the annunciator 81*a* and the transmitter circuit 83*a* if either of the selector sets 70*b* or 70*c* receives a wave front before the selector set 70*a*. Similarly, the transmitting circuit 83*a* is inductively coupled to a blocking circuit including conventional rectifying means 90*a* for applying a blocking potential to the grids of the tubes in the radio frequency detecting and amplifying circuits 86*a* and 87*a* in the event that the detector 70*a* receives a wave front prior to the detectors 70*b* and 70*c*.

Referring now to the central station shown in Figure 8, the directional receiving antennae 70*a*', 70*b*' and 70*c*', which are adapted to receive radio frequency energy from the selector sets 70*a*, 70*b* and 70*c*, respectively, are connected to conventional type variable capacitances 91, 91' and 91'', respectively, which are connected to the control grids 92, 92' and 92'', respectively, of conventional type electronic tubes 93, 93' and 93''. Since the circuits in which the tubes 93, 93' and 93'' are employed are substantially identical, it will be necessary to describe only one in detail, corresponding parts in the other two being designated by corresponding primed and double-primed reference characters.

Connected across the control grid 92 and the filament 107 of the tube 93 is a conventional type grid resistor 94, in parallel with which is connected conventional rectifying means 95 and the secondary winding 96 of a transformer 97. The primary winding 98 of the transformer 97 is connected by the conductors 99 and 100 to the secondary winding 101' of a transformer 102' and to a winding 103'' inductively coupled to the winding 96''. The plate element 111 of the tube 93 is connected in series with a conventional type indicator 104, the primary winding 105 of the transformer 102, and a source of plate supply 106 to the filament 107 of the tube 93.

In order to provide for mutual suppression of the receivers 70*d*, 70*e* and 70*f*, the secondary winding 101 of the transformer 102 is connected to the primary windings 103' and 98'' of the transformers 97' and 97'', respectively. In similar fashion, the secondary winding 101' of the transformer 102' is connected to the primary windings 98 and 103'' of the transformers 97 and 97'', and the secondary winding 101'' of the transformer 102'' is connected to the primary windings 98' and 103 of the transformers 97' and 97, respectively.

Assuming that a wave front from a suitable source 112 reaches the detector 70*b* before it reaches the detectors 70*a* or 70*c*, the detector set 70*b* will indicate the arrival of the wave front at the location and will transmit a radio frequency signal of frequency $f''$ to the detector sets 70a and 70c and to the central station 70. At the detector set 70a, the signal will be picked up by the antenna 71a and detected and amplified by the circuits 86a and 87a, respectively. The amplified voltage will be delivered to the rectifying means 89a and the rectified signal applied to the grid of the amplifying tube 82a, thereby preventing the station 70a from responding to a wave front. Similar action will take place at the detector set 70c, so that it will not respond to the arrival of a wave front.

At the central station 70, the signal of frequency $f''$ transmitted by the detector 70b is picked up by the antenna 70b' and is transmitted through the condenser 91' to the control grid 92' of the tube 93', causing plate current to flow through the plate circuit thereof. The flow of plate current actuates the indicating instrument 104' and causes a voltage to be induced in the winding 101' of the transformer 102'. This induced voltage is transmitted to the secondary windings 98 and 103'' of the transformers 97 and 97'', respectively, thereby inducing corresponding voltages in the secondary windings 96 and 96'' thereof. The voltages induced in the windings 96 and 96'' are rectified by the rectifying means 95 and 95'', respectively, and are applied to the control grid elements 92 and 92'' of the tubes 93 and 93'' thereby suppressing them and preventing them from operating.

In order to provide a lasting indication of the arrival of a signal at the receiver 70e, the energizing winding 107' of a conventional type holding relay may be connected in the plate circuit of the tube 93'. The relay may be provided with contacts 108' in a circuit including a source of electrical energy 109' and a second instrument 110' like the instrument 104'. It will be noted that when the plate circuit of the tube 93' is energized the contacts 108' will be closed, supplying electrical energy to the instrument 110'. Similar indicating circuits are provided for the tubes 93 and 93''.

By virtue of the circuits described above, the energization of any of the tubes 93, 93' or 93'' will act to suppress the operation of the other tubes, thereby providing an indication at the central station 70 as to which of the detector sets 70a, 70b or 70c receives the wave front first.

It will be understood that devices of the type disclosed in Figure 3 may also be used for determining the direction of a wave source and for guiding, for example, ships and aeroplanes. Since a detector can detect the arrival of a wave front, signal its arrival, and suppress another detector at only slightly less than the speed of light, the resolution of the detectors is very high. Accordingly, when the detectors are spaced apart, for example on a ship, one detector or the other will signal when the wave source is not perpendicular to the center point of a line extending between the detectors, thus indicating the direction of the ship relatively to the wave source.

It will be further understood that the methods and means described above can be adapted to other types of wave energy, including electromagnetic radiation and light. Where such types of energy are employed, it is only necessary to substitute radio or light wave responsive means for the mechanical wave responsive crystals 16.

In addition to the various uses described above, this invention is capable of other operations which one skilled in the art of wavemetry might desire to perform, such as, telling the positions of cavities in structures and foundations, wells, graves and sunken vessels; locating sounds of disorder; and testing flaws by observing discontinuities in elastic bodies and strain in materials. In seismology, my invention may be used to discover the origins of earthquake movement and to forecast eventual places of disaster. Therefore, the forms of the invention described above should be considered as illustrative and not as limiting the scope of the following claims.

I claim:

1. A method of investigating the characteristic of an inhomogeneous medium comprising, simultaneously propagating a plurality of wave front components through the medium from a common origin, disposing wave responsive means at at least two points in the medium that are spaced apart with respect to the directions of propagation of two of said wave front components, causing the first of said wave responsive means signalling the arrival of wave energy from one of said wave front components thereto to render the other of said wave responsive means nonresponsive to wave energy from said wave front components, rendering both of said wave responsive means again effective to respond to wave energy, and repeating said steps as at least one of said wave responsive means is moved to different locations in said medium that are spaced apart from the other of said wave responsive means with respect to the directions of propagation of said two wave front components until a different one of said wave responsive means becomes the first to signal the arrival of energy from a wave front component, whereby positions in the medium where wave energy from said two wave front components reaches said respective wave responsive means at substantially the same time may be located.

2. A method of investigating the characteristics of an inhomogeneous medium comprising, simultaneously propagating a plurality of wave front components through the medium from a common origin, disposing wave responsive means at at least two points in the medium that are spaced apart with respect to the direction of propagation of two of said wave front components, and on the same side of said common origin, causing the first of said valve responsive means signalling the arrival of wave energy from one of said wave front components thereto to render the other of said wave responsive means nonresponsive to wave energy from said wave front component, rendering both of said wave responsive means again effective to respond to wave energy, and repeating said steps as at least one of said wave responsive means is moved to different locations in said medium that are spaced apart from the other of said wave responsive means with respect to the direction of propagation of said two wave front components until a different one of said wave responsive means becomes the first to signal the arrival of energy from a wave front component, whereby positions in the medium where wave energy from said wave front components reaches said respective wave responsive means at substantially the same time may be located.

3. A method of investigating the characteristic of an inhomogeneous medium comprising, simultaneously propagating a plurality of wave front components through the medium from a common origin, disposing wave responsive means at at least two points in the medium that are spaced apart with respect to the direction of propagation of two of said wave front components, and on opposite sides of said common origin, causing the first of said wave responsive means signalling the arrival of wave energy from one of said wave front components thereto to render the other of said wave responsive means non-responsive to wave energy from said wave front components, rendering both of said wave responsive means again effective to respond to wave energy, and repeating said steps as at least one of said wave responsive means is moved to different locations in said medium that are spaced apart from the other of said wave responsive means with respect to the direction of propagation of said two wave front components until a different one of said wave responsive means becomes the first to signal the arrival of energy from a wave front component, whereby positions in the medium where wave energy from said two wave front components reaches said respective wave responsive means at substantially the same time may be located.

4. A method of exploring subterranean formations comprising simultaneously transmitting a plurality of wave front components through the earth from a reference point at the surface, disposing wave responsive means at at least two points in the earth that are spaced apart with respect to the direction of propagation of two of said wave front components, causing the first of said wave responsive means signalling the arrival of wave energy from one of said wave front components thereto to render the other of said wave responsive means non-responsive to wave energy from said wave front components, rendering both of said wave responsive means again effective to respond to wave energy, and repeating said steps as at least one of said wave responsive means is moved to different locations in the earth that are spaced apart from the other of said wave responsive means with respect to the direction of propagation of said two wave front components until a different one of said wave responsive means becomes the first to signal the arrival of energy from a wave front component, whereby positions in the earth where wave energy from said two wave front components reaches said respective wave responsive means at substantially the same time may be located.

5. A method of exploring subterranean formations comprising simultaneously transmitting a surface wave front component and a subterranean wave front component through the earth from a reference point at the surface, disposing wave responsive means at at least two points in the earth that are spaced apart with respect to the direction of propagation of said wave front components, and on the same side of said reference point, causing the first of said wave responsive means signalling the arrival of wave energy from one of said wave front components thereto to render the other of said wave responsive means non-responsive to wave energy from said wave front components, rendering both of said wave responsive means again effective to respond to wave energy, and repeating said steps as both of said wave responsive means are moved to different locations in the earth that are spaced apart with respect to the direction of propagation of said wave front components until a different one of said wave responsive means becomes the first to signal the arrival of energy from a wave front component, whereby positions in the earth where wave energy from said wave front components reaches said respective wave responsive means at substantially the same time may be located.

6. A method of exploring subterranean formations comprising simultaneously transmitting a plurality of wave front components through the earth from a reference point at the surface, disposing wave responsive means at at least two points in the earth that are spaced apart with respect to the direction of propagation of two of said wave front components, and on opposite sides of said reference point, causing the first of said wave responsive means signalling the arrival of wave energy from one of said two wave front components thereto to render the other of said wave responsive means non-responsive to wave energy from said wave front components, rendering both of said wave responsive means again effective to respond to wave energy, and repeating said steps as at least one of said wave responsive means is moved to different locations in the earth that are spaced apart from the other of said wave responsive means with respect to the direction of propagation of said two wave front components until a different one of said wave responsive means becomes the first to signal the arrival of energy from a wave front component, whereby positions in the earth where wave energy from said two wave front components reaches said respective wave responsive means at substantially the same time may be located.

7. A method of investigating the characteristics of an inhomogeneous medium comprising, simultaneously propagating a plurality of wave front components through the medium from a common origin, disposing wave responsive means at at least two points on the surface of the medium that are spaced apart with respect to the directions of propagation of two of said wave front components, obtaining indications of the order of arrival of said two wave front components at said respective wave responsive means, moving at least one of said wave responsive means to different points on the surface of said medium that are spaced apart from the other of said wave responsive means with respect to the directions of propagation of said two wave front components, and repeating said propagating and indicating obtaining steps while said one wave responsive means is located at said different points until a reversal in the order of arrival of said two wave front components at said respective wave responsive means occurs.

8. A method of investigating subterranean formations comprising, simultaneously propagating a plurality of wave front components through the earth from a common origin, disposing wave responsive means at at least two points on the surface of the earth that are spaced apart with respect to the direction of propagation of two of said wave front components, obtaining indications of the order of arrival of wave energy from said two wave front components at said respective wave responsive means, moving at least one of said wave responsive means to different points on the surface of the earth that are spaced apart from the other of said wave responsive means with respect to the direction of propagation of said two wave front components, and repeating said propagating and indicating obtaining steps while said one wave responsive means is located at said different points until a reversal in the order of arrival of said two wave front components at said respective wave responsive means occurs.

ALEXANDER McLEAN NICOLSON.

REFERENCES CITED

The following references are of record in the file of this patent:

UNITED STATES PATENTS

| Number | Name | Date |
|---|---|---|
| Re. 21,183 | Blau | Aug. 29, 1939 |
| 1,724,495 | McCollum | Aug. 13, 1929 |
| 1,782,445 | Rieber | Nov. 25, 1930 |
| 1,799,398 | Taylor | Apr. 7, 1931 |
| 1,801,657 | Buyko | Apr. 21, 1931 |
| 1,892,147 | Hayes | Dec. 27, 1932 |
| 1,902,184 | Rieber | Mar. 21, 1933 |
| 2,001,429 | McCollum et al. | May 14, 1935 |
| 2,007,211 | Nicolson | July 9, 1935 |
| 2,024,921 | Green | Dec. 17, 1935 |
| 2,064,451 | Voorhees | Dec. 15, 1936 |
| 2,087,120 | Salvartori et al. | July 13, 1937 |
| 2,099,837 | Blau | Nov. 23, 1937 |
| 2,117,365 | Salvartori et al. | May 17, 1938 |
| 2,148,422 | Blau | Feb. 28, 1939 |
| 2,304,965 | Sproule | Dec. 15, 1942 |

FOREIGN PATENTS

| Number | Country | Date |
|---|---|---|
| 523,880 | Germany | Apr. 29, 1931 |

Certificate of Correction

Patent No. 2,499,605

March 7, 1950

ALEXANDER McLEAN NICOLSON

It is hereby certified that errors appear in the printed specification of the above numbered patent requiring correction as follows:

Column 1, line 5, before "terrain" insert the word *the*; column 3, line 65, for "the" before biasing read *a*; column 4, line 52, before "contour" strike out "give"; column 7, line 1, for "in operative" read *inoperative*; column 10, line 50, for "valve" read *wave*; and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*